US007880326B2

(12) United States Patent
Khan et al.

(10) Patent No.: US 7,880,326 B2
(45) Date of Patent: Feb. 1, 2011

(54) INTEGRATED POWER MODULE FOR HYBRID AND FUEL CELL VEHICLES

(75) Inventors: Aftab Khan, Dearborn, MI (US); Mohamad Zeidan, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 636 days.

(21) Appl. No.: 11/032,343

(22) Filed: Jan. 10, 2005

(65) Prior Publication Data

US 2006/0151219 A1 Jul. 13, 2006

(51) Int. Cl.
- B60L 1/00 (2006.01)
- B60L 3/00 (2006.01)
- H02G 3/00 (2006.01)

(52) U.S. Cl. .......................... 307/10.1; 307/45
(58) Field of Classification Search ................ 307/10.1, 307/45, 58
See application file for complete search history.

(56) References Cited

U.S. PATENT DOCUMENTS

| 5,583,419 | A | * | 12/1996 | Haller | 322/8 |
| 5,982,645 | A | * | 11/1999 | Levran et al. | 363/37 |
| 6,040,561 | A | * | 3/2000 | Murty | 219/494 |
| 6,043,996 | A | * | 3/2000 | Kumar | 363/41 |
| 6,137,705 | A |   | 10/2000 | Maekawa et al. | 363/132 |
| 6,534,883 | B2 | * | 3/2003 | Yoshida et al. | 307/10.1 |
| 6,664,762 | B2 | * | 12/2003 | Kutkut | 320/116 |
| 6,717,288 | B2 | * | 4/2004 | Besnier et al. | 307/10.1 |
| 6,795,756 | B1 |   | 9/2004 | Zhang et al. | 701/22 |
| 7,084,525 | B2 | * | 8/2006 | Rajashekara et al. | 307/82 |
| 2005/0094330 | A1 | * | 5/2005 | Guenther et al. | 361/18 |
| 2006/0022478 | A1 | * | 2/2006 | DeLong et al. | 296/37.8 |

FOREIGN PATENT DOCUMENTS

| DE | 19707277 A1 | 9/1998 |
| EP | 0207280 | 7/1982 |

OTHER PUBLICATIONS

German Search Report, Application No. 10 2006 000 796.4-32, dated May 27, 2010, pp. 1-4.
Khan, I.A., DC-to-DC Converters for Electric and Hybrid Vehicles, in Power Electronics in Transportation, 1994, pp. 113-122.

* cited by examiner

Primary Examiner—Jared J Fureman
Assistant Examiner—Carlos Amaya
(74) Attorney, Agent, or Firm—MacMillan, Sobanski & Todd, LLC

(57) ABSTRACT

An integrated power module conditions and distributes electrical power from a high voltage source in a vehicle, wherein the vehicle includes an electrically-driven traction motor. A common primary DC-to-DC converter stage for coupling to the high voltage source produces an intermediate DC voltage on an intermediate voltage bus. The primary DC-to-DC converter stage comprises a plurality of phases including respective secondary circuits selectably coupled to the intermediate voltage bus. A plurality of power conditioners are each coupled to the intermediate voltage bus for transforming the intermediate DC voltage to respective power outputs, wherein the power outputs including a first AC output for driving the traction motor.

18 Claims, 3 Drawing Sheets

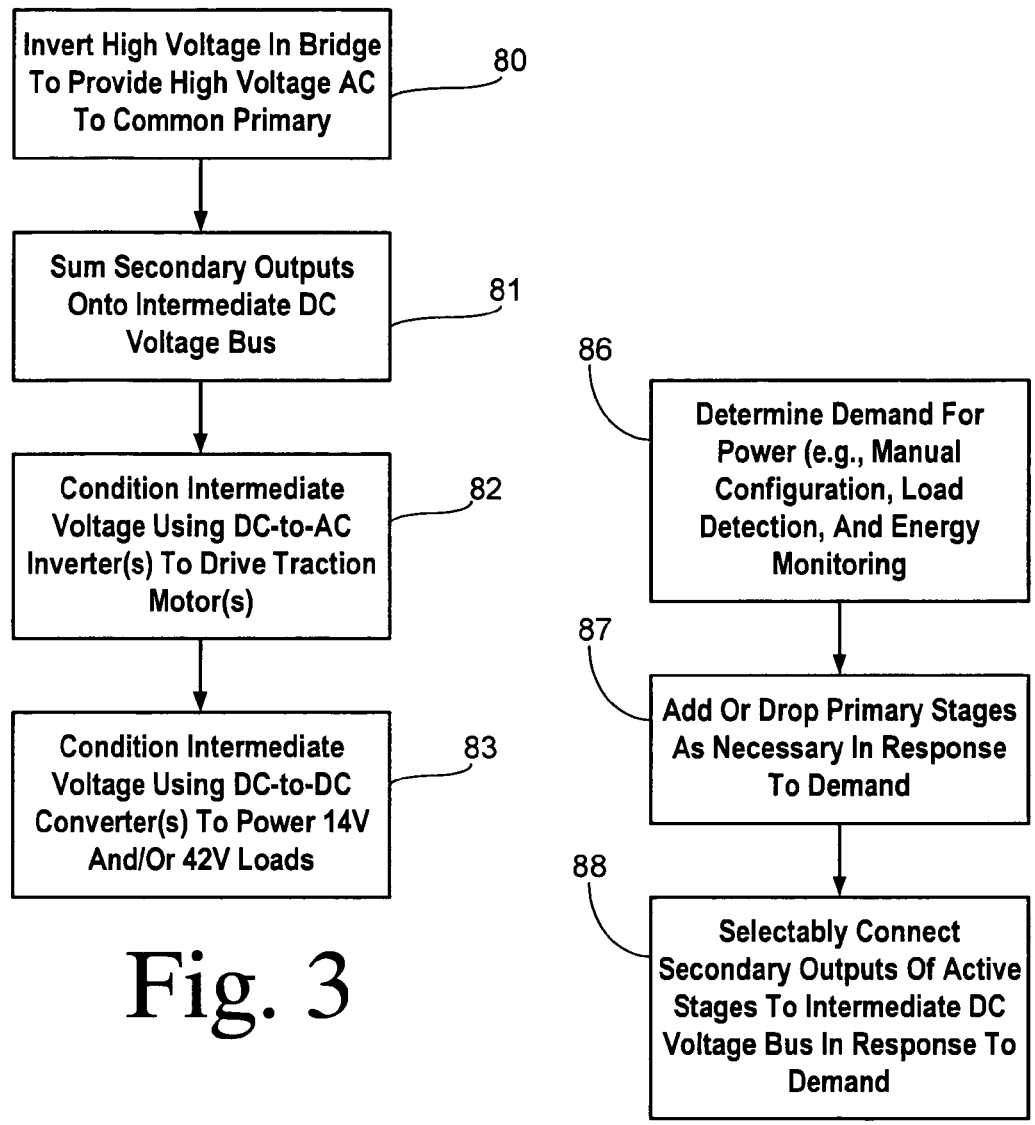
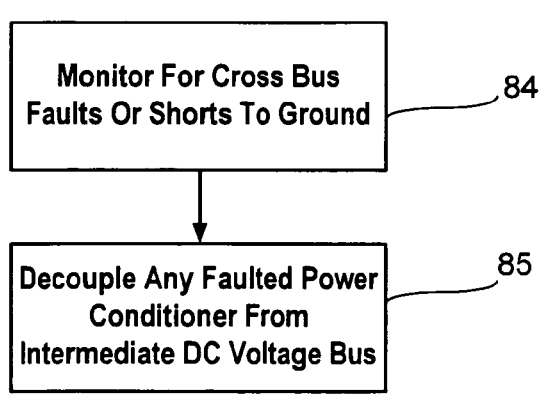

US 7,880,326 B2

INTEGRATED POWER MODULE FOR HYBRID AND FUEL CELL VEHICLES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to electric power conditioning and distribution in electric vehicles, and, more specifically, to an integrated electric power module combining the functionality of DC-to-DC converters, AC inverters, and traction motor inverters for use in hybrid and fuel cell passenger vehicles.

The use of transportation vehicles (e.g., automobiles) using electric traction drives is increasing. Hybrid vehicles combining electric traction drives with internal combustion engines and pure electric vehicles offer potential improvements in fuel efficiency and reductions in gaseous and particulate emissions. A high voltage (e.g., about 300 volt) source typically comprising a battery is charged by a generator (such as a fuel cell or a dynamoelectric generator driven by the combustion engine) and the high voltage from the battery is distributed and conditioned by various converter and inverter modules for use by different vehicle systems. Power inverter modules produce multiphase AC power for driving the front and rear traction motors. Separate DC-to-DC converters are usually provided for down-converting the high voltage to a 42V bus and to a 14V bus for supplying most of the other electrical loads. A single-phase DC-to-AC inverter may also be provided for creating 120V and/or 240V AC power for operating electrical accessories via a plug-in outlet.

One obstacle to widespread adoption of such vehicles has been the high cost of the relatively numerous and complex components that have been required. Thus, it would be desirable to reduce the component costs associated with electric power conditioning and distribution in hybrid and electric vehicles. Reduction of the gross weight of these components is also desirable since any further efficiency improvements make the vehicles even more attractive compared to conventional gasoline vehicles.

SUMMARY OF THE INVENTION

The present invention has the advantages of improved performance, weight reduction, and lower costs for an electric power conditioning and distribution system for use in hybrid, fuel cell, and other electric vehicles. An integrated power module of the invention communizes certain components of the formerly separate converters and inverters and provides novel apparatus and methods that improve efficiency, robustness, and reliability.

In one aspect of the invention, an integrated power module is provided for conditioning and distributing electrical power from a high voltage source in a vehicle. A common primary DC-to-DC converter stage for coupling to the high voltage source produces an intermediate DC voltage on an intermediate voltage bus. The primary DC-to-DC converter stage comprises a plurality of phases including respective secondary circuits selectably coupled to the intermediate voltage bus. A plurality of power conditioners are each coupled to the intermediate voltage bus for transforming the intermediate DC voltage to respective power outputs.

BRIEF DESCRIPTION OF THE DRAWINGS

FIG. 3 is a flowchart showing a preferred overall method of the present invention.

FIG. 4 is a flowchart showing a preferred method of protecting system operation from faults occurring in individual power conditioners.

FIG. 5 is a flowchart showing a preferred method of adapting the amount of power made available to match the power demand.

DETAILED DESCRIPTION OF PREFERRED EMBODIMENTS

Figure 1:
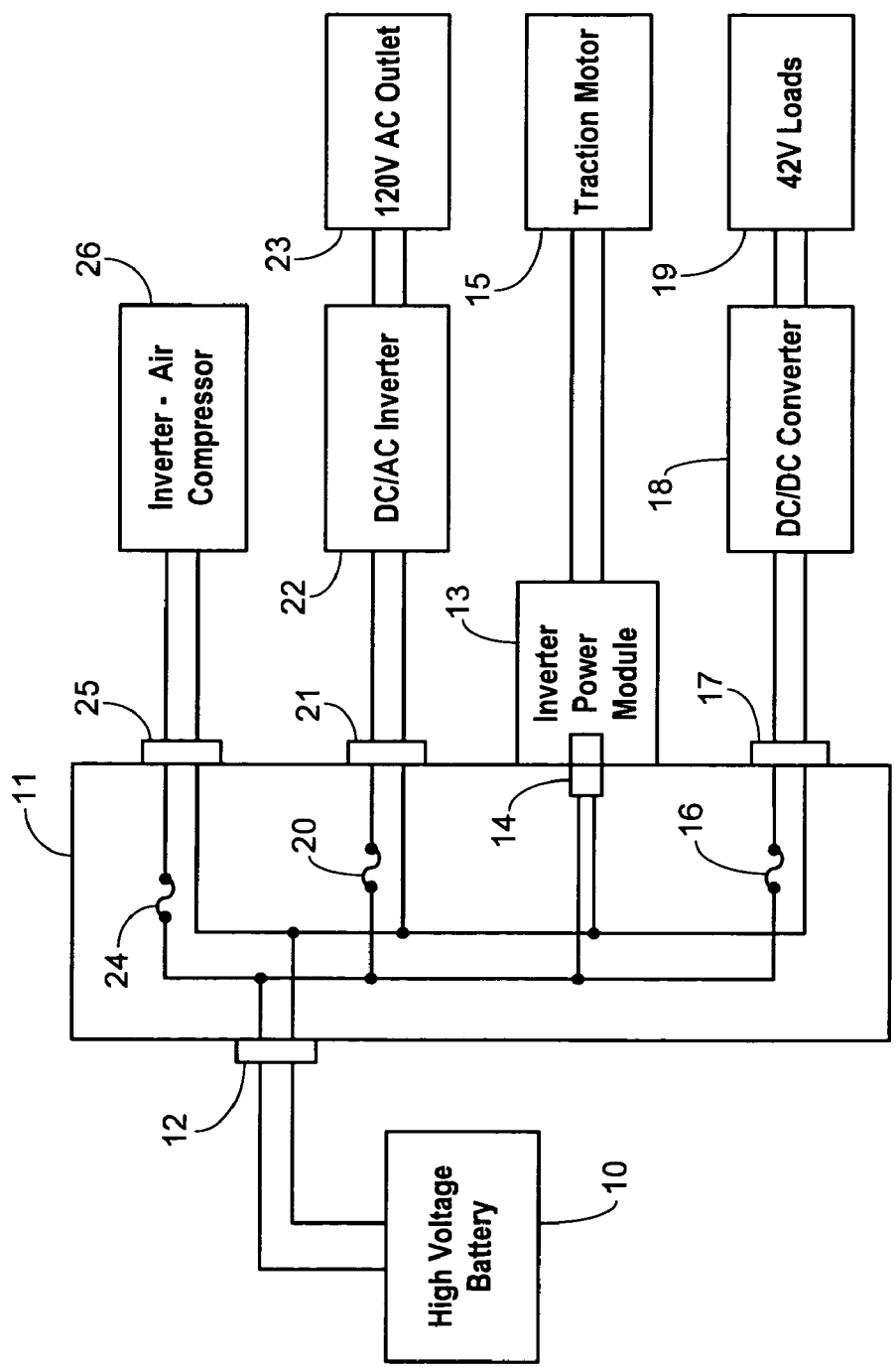
FIG. 1 is a block diagram showing a prior art electrical distribution system for electrically driven vehicles.

Referring now to FIG. 1, a prior art power distribution and conditioning system is shown as used in electrically-powered vehicles such as a hybrid electric vehicle. A source of high voltage such as a battery 10 is connected to a high voltage power distribution box 11 via a connector 12. Battery 10 may be charged by a fuel cell or an internal combustion engine (not shown), for example. Distribution box 11 passes high voltage through to an inverter power module 13 via a connector 14. Inverter module 13 may be mounted directly to box 11 and includes all the power conditioning apparatus necessary to generate AC drive signals for a traction motor 15. Separate inverter power modules may typically be provided for energizing separate traction motor drives (e.g., front and rear drives).

Distribution box 11 couples the high voltage from battery 10 through a fuse 16 to an output connector 17. A DC-to-DC converter 18 converts the high voltage received at connector 17 to 42 volts DC for powering vehicle loads 19. Fuse 20 and connector 21 couple high voltage to a DC-to-AC inverter 22 for generating 120 volts AC at an outlet 23. A fuse 24 and connector 25 supply high voltage to an inverter/air compressor unit 26.

The conventional system as shown in FIG. 1 has several drawbacks. Electrical losses of all the separate power conditioning processes are undesirably large. The packaging of multiple modules with their separate cooling systems (e.g., circulating fluid systems and/or cooling fins), sealing, wiring, and housings results in excessive cost, complexity, and weight.

Figure 2:
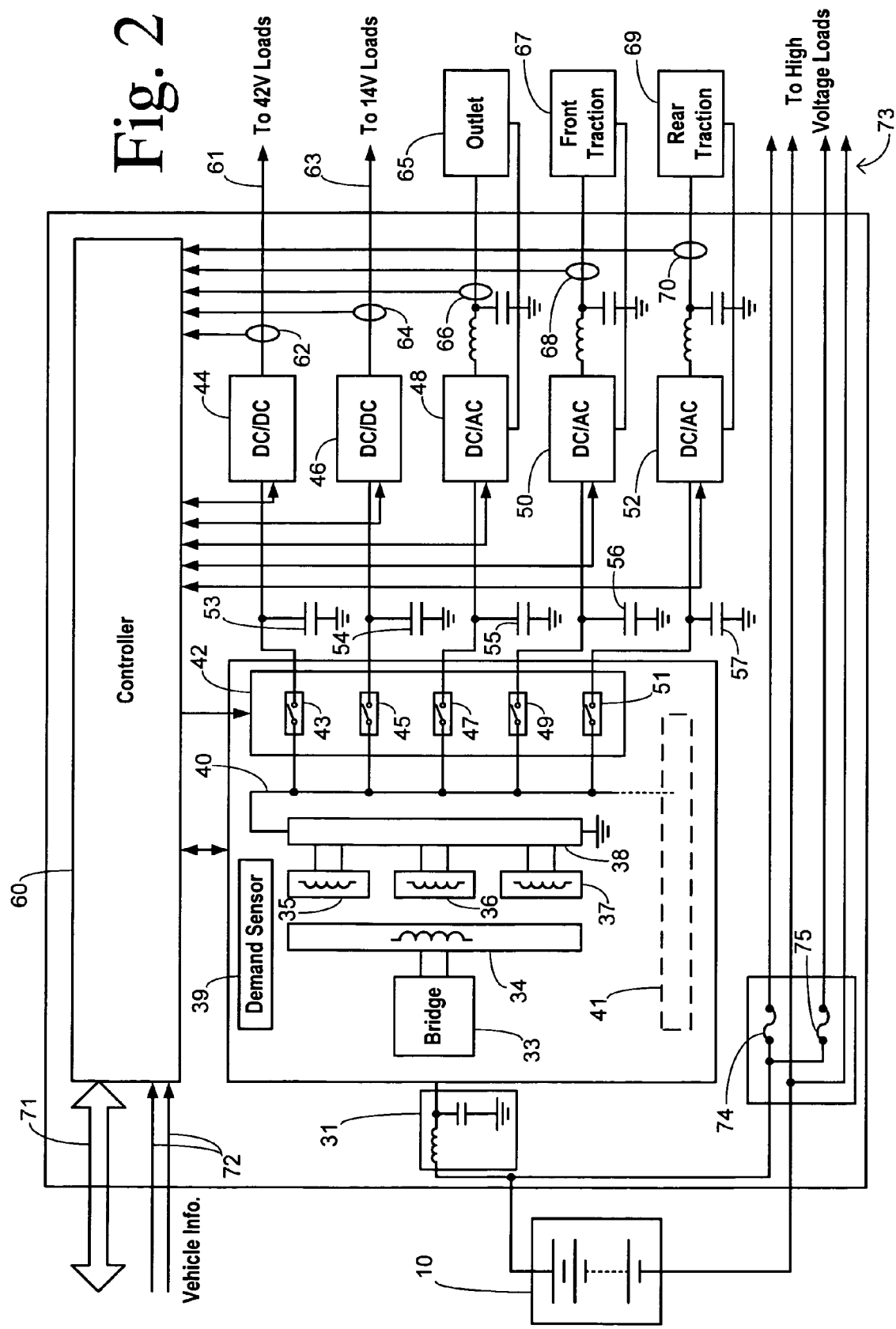
FIG. 2 is a block diagram showing an integrated power module of the present invention.

The present invention provides for integration of a power distribution box, DC-to-DC converters, and DC-to-AC inverters with sharing of common components into an integrated module 30 as shown in FIG. 2. Battery 10 is connected to a common primary DC-to-DC converter 32 via an input filter 31. The structure and operation of converter 32 results in dramatic reduction in electrical and core losses while providing a scalable architecture that is adaptable to many vehicle applications. A bridge 33 may comprise a switching bridge for converting the high DC voltage to a high AC voltage that is applied to a common primary circuit 34 (e.g., the primary winding of a transformer). A plurality of secondary circuits 35, 36, and 37 may each include a secondary winding magnetically coupled to primary circuit 34 and a rectifier and filter for generating an intermediate DC voltage. Depending upon instantaneous power required, each secondary circuit output can be selectably coupled to an intermediate voltage bus 40 via a coupling matrix 38.

The magnitude of the intermediate DC voltage depends on the types and magnitudes of the conditioned outputs that are desired. Preferably, the intermediate voltage is selected to be as low as possible while supporting the needs of the power conditioners. For example, if the highest output voltage from the power conditioners is 120 VAC, then the intermediate DC voltage may be about 170 VDC. By maintaining the intermediate DC voltage as low as possible, the components that may be used in the power conditioners are cheaper and more reliable and a greater lifetime of the components is achieved.

By commonizing a first block of power conversion, efficiency and adaptability are increased while parts count, cost, and weight are reduced. Intermediate voltage bus 40 couples an efficiently generated intermediate voltage to all the downstream power devices which are themselves able to operate at lower losses because of the reduced voltage they operate at.

Converter 32 has a scalable power capability by providing separately actuatable secondary circuits. In addition, multiple converter stages can optionally be provided that may be connected in parallel to each other. Thus, a second converter stage 41 having substantially identical bridge, primary circuit, and secondary circuits may be provided. The current capacity of intermediate voltage bus 40 thus depends on the number of stages that are activated and on the number of secondary circuits contributing to the voltage and current generated onto bus 40. Voltage stress on components and overall power losses are minimized as a result of each secondary circuit operating at lower current (the higher current levels being obtained by aggregating as many secondary circuits as necessary). A demand sense circuit 39 may be provided for determining the number of secondary circuits and/or stages to be activated as will be described in more detail below.

A switching bank 42 is connected to bus 40 for selectably coupling and decoupling the intermediate DC voltage with a plurality of power conditioners. A switch 43 couples intermediate voltage bus 40 to a DC-to-DC converter 44 with a 42 volt DC output. A switch 45 couples intermediate voltage bus 40 to a DC-to-DC converter 46 with a 14 volt DC output. A switch 47 couples intermediate voltage bus 40 to a DC-to-AC inverter 48 with a 120 or 240 volt AC output. A switch 49 couples intermediate voltage bus 40 to a DC-to-AC inverter 50 with a variable frequency output for driving a traction motor. A switch 51 couples intermediate voltage bus 40 to a DC-to-AC inverter 52 with a variable frequency output for driving another traction motor. A filtering capacitor 53-57 is coupled at the input of each power conditioner, respectively.

A controller 60 is coupled to primary converter 32 and to each of the power conditioners. Controller 60 adapts the power output by turning on and off the appropriate number of stages in converter 32 and by adjusting coupling matrix 38 so that sufficient current is provided to bus 40 to support the instantaneous load requirements. Controller 60 is coupled with each of the power conditioners for exchanging control and data signals as shown. The load status for each power conditioner (e.g., whether particular loads are turned on or off, or measurements of energy being supplied to loads) may be communicated to controller 60. This information may be used by controller 60 for determining a demand signal. The demand signal may also be determined in response to measurements of energy draw made within converter 32 by demand sensing circuit 39. In another embodiment, the demand signal is determined in accordance with a manually configured value that corresponds to a particular vehicle application. Alternatively, the demand signal may be determined in accordance with a combination of all three of the foregoing methods. Furthermore, the number of stages to be activated may be determined by a sensed or configured vehicle load configuration while the number of activated secondary circuits within the active stages may be altered in real time according to a sensed draw of energy.

By way of example, a demand signal may be determined in response to information concerning the vehicle speed. The greatest electrical power is needed when a vehicle accelerates from a stop. At a zero speed signal, a demand signal indicative of the highest demand is generated so that all stages and all secondary circuits are activated in order to meet the demand when the vehicle accelerates. When a speed threshold is reached, then some stages and/or secondary circuits may be shut down.

Because each power conditioner coupled to intermediate voltage bus 40 is sharing power from a common primary circuit, the occurrence of a fault in one power conditioner can have adverse effects on the other power conditioners. Controller 60 monitors for faults by monitoring a plurality of fault sensors that are adapted to detect cross bus faults and shorts to ground, for example. Controller 60 decouples a faulted power conditioner from bus 40 by controlling the states of the switches in switch bank 42. DC-to-DC converter 44 has an output 61 for coupling to 42V loads which is monitored by a fault sensor 62 that is coupled to controller 60. DC-to-DC converter 46 has an output 63 for coupling to 12V loads which is monitored by a fault sensor 64 that is coupled to controller 60. DC-to-AC inverter 48 has an output coupled to an AC convenience outlet 65 and monitored by a fault sensor 66 connected to controller 60. DC-to-AC inverter 50 has an output coupled to a front traction drive 67 and monitored by a fault sensor 68 connected to controller 60. DC-to-AC inverter 52 has an output coupled to a rear traction drive 69 and monitored by a fault sensor 70 connected to controller 60.

In an alternative embodiment, individual power conditioners may include a standalone controller separate from controller 60. When a fault is detected, a message is sent to the standalone controller for deactivating a faulted power conditioner without needing a switch in the switching bank. No switching bank would be needed if all power conditioners can be deactivated using a control message from controller 60. In yet another embodiment, fault monitoring could be performed individually by controller in a power conditioner which could deactivate itself when a fault is detected.

Controller 60 is coupled to a vehicle multiplex bus 71 and to individual vehicle information signals 72. For example, vehicle control signals indicating a vehicle speed demand may be received over bus 71 in order to generate appropriate inverter command signals in controller 60 for controlling inverters 50 and 52.

Module 30 also provides pass through of the high voltage DC from battery 10 to a plurality of high voltage output lines 73 supplied through fuses 74 and 75.

An overall method of the invention is shown in FIG. 3. In step 80, high DC voltage from the battery is inverted in a switching bridge to provide a high voltage AC signal to the common primary circuit in the common (e.g., first stage) DC-to-DC converter. The secondary outputs driven by the primary circuit are summed onto the intermediate DC voltage bus in step 81. In step 82, the intermediate voltage is conditioned by one or more DC-to-AC inverters to drive one or more traction motors in the vehicle. In step 83, the intermediate voltage is conditioned by one or more DC-to-DC converters to power 14V and/or 42V loads within the vehicle.

Likewise, another DC-to-AC inverter may condition the intermediate voltage into a standard 120V or 240V AC signal for a convenience outlet.

FIG. 4 shows a method of avoiding the degradation of operation of the common DC-to-DC converter when a power conditioner is faulty. The method monitors for faults (e.g., cross bus faults or short circuit to ground). In step 85, any faulted power conditioner is decoupled from the intermediate voltage bus in order to protect the other power conditioners.

FIG. 5 shows a preferred method of managing the activation of stages and secondary outputs (i.e., phases). In step 86, demand for power is determined (e.g., by detecting a manual configuration, by detecting the connected loads and their status, or by monitoring energy draw from the primary converter). In step 87, stages are added or dropped as necessary in response to demand. Secondary outputs in the active stages are selectably connected to the intermediate voltage bus in step 88 in response to the demand.

The foregoing invention has demonstrated an integrated power module with true scalability that can fulfill the power needs of any hybrid, fuel cell, or other electric vehicle. The use of a single enclosure and cooling system reduces weight, complexity, and cost. Expensive waterproof, high voltage connections and connectors are reduced since less external cabling is required. Auxiliary support circuitry such as multiplex transceivers is reduced by the integrated module. The combination of a first DC-to-DC converter generating an intermediate high voltage bus with the use of selectably controllable stages and the use of multiple secondary circuits operating at lower current levels results in very low electrical and core losses and in high efficiency.

What is claimed is:

1. An integrated power module for conditioning and distributing electrical power from a voltage source to a plurality of power conditioners in a vehicle, the integrated power module comprising:
    a common primary DC-to-DC converter including a primary circuit that is adapted to be coupled to a voltage source, an intermediate voltage bus, and a plurality of secondary circuits that are each coupled to the primary circuit and are selectively coupled to the intermediate voltage bus;
    a plurality of power conditioners that are each coupled to the intermediate voltage bus and have respective power outputs; and
    a demand sensing circuit for generating a demand signal that is indicative of an amount of electrical energy drawn from the power conditioners and a controller that is responsive to the demand signal for selectively coupling the plurality of secondary circuits to the intermediate voltage bus.

2. The integrated power module defined in claim 1 further including a second common primary DC-to-DC converter stage that includes a second primary circuit, a second intermediate voltage bus, and a second plurality of secondary circuits that are each coupled to the second primary circuit and are selectively coupled to the second intermediate voltage bus, and wherein the controller selectively activates the second converter stage in response to the demand signal.

3. The integrated power module defined in claim 1 further including a plurality of switches that respectively connect each of the plurality of power conditioners to the intermediate voltage bus.

4. The integrated power module defined in claim 3 further including a plurality of fault sensors that are respectively coupled to each of the plurality of power conditioners for generating respective fault signals, and further including a controller that is responsive to the fault signals for decoupling the power conditioners from the intermediate voltage bus.

5. The integrated power module defined in claim 1 wherein the plurality of power conditioners include a DC-to-DC converter for generating a DC output and a DC-to-AC inverter for generating an AC output.

6. The integrated power module defined in claim 1 wherein the plurality of power conditioners include a first DC-to-DC converter for generating a DC output, a second DC-to-DC converter for generating a second DC output, a first DC-to-AC inverter for generating a first AC output, a second DC-to-AC inverter for generating a second AC output, and a third DC-to-AC inverter for generating a third AC output.

7. The integrated power module defined in claim 1 further including a coupling matrix that selectively couples the plurality of secondary circuits to the intermediate voltage bus.

8. A method of conditioning and distributing electrical power from a voltage source to a plurality of power conditioners in a vehicle, the method comprising the steps of:
    (a) inverting a high voltage from a high voltage source to generate an alternating current in a common primary circuit;
    (b) summing a plurality of secondary outputs from a plurality of secondary circuits each coupled to said common primary circuit to provide an intermediate DC voltage on an intermediate voltage bus;
    (c) conditioning said intermediate DC voltage using a first power conditioner coupled to said intermediate voltage bus to provide a first conditioned output;
    (d) conditioning said intermediate DC voltage using a second power conditioner coupled to said intermediate voltage bus to provide a second conditioned output; and
    (e) determining a demand signal indicative of electrical energy drawn from said power conditioners; and coupling selected ones of said secondary outputs to said intermediate voltage bus in response to said demand signal.

9. The method defined in claim 8 wherein said first power conditioner comprises an AC power conditioner for driving a traction motor and wherein said second power conditioner comprises a DC power conditioner for powering lower voltage DC loads.

10. The method defined in claim 9 further comprising the step of: conditioning said intermediate DC voltage using a second AC power conditioner coupled to said intermediate voltage bus for driving a second traction motor.

11. The method defined in claim 9 further comprising the step of: conditioning said intermediate DC voltage using a second DC power conditioner coupled to said intermediate voltage bus for powering DC loads at a second lower DC voltage.

12. The method defined in claim 8 wherein said common primary circuit, said secondary circuits, and said power conditioners are integrated into a single module.

13. The method defined in claim 12 further comprising the steps of: inverting said high voltage from said high voltage source to generate an alternating current in a second-stage primary circuit connected in parallel with said common primary circuit; summing a plurality of second-stage secondary outputs from a plurality of second-stage secondary circuits each coupled to said second-stage primary circuit onto said intermediate voltage bus in response to said demand signal.

14. The method defined in claim 8 wherein said demand signal is determined by electrically monitoring energy consumption in real time.

15. The method defined in claim 8 wherein said demand signal is determined in response to a load status.

16. The method defined in claim 8 further comprising the steps of: detecting fault conditions related to said power conditioners; and decoupling a respective power conditioner from said intermediate voltage bus when a corresponding fault condition is detected.

17. An integrated power module for conditioning and distributing electrical power from a voltage source to a plurality of power conditioners in a vehicle, the integrated power module comprising:
- a common primary DC-to-DC converter including a primary circuit that is adapted to be coupled to a voltage source, an intermediate voltage bus, and a plurality of secondary circuits that are each coupled to the primary circuit and are selectively coupled to the intermediate voltage bus;
- a plurality of power conditioners that are each coupled to the intermediate voltage bus and have respective power outputs; and
- a plurality of fault sensors that are respectively coupled to each of the plurality of power conditioners for generating respective fault signals, and further including a controller that is responsive to the fault signals for decoupling the power conditioners from the intermediate voltage bus.

18. An integrated power module for conditioning and distributing electrical power from a voltage source to a plurality of power conditioners in a vehicle, the integrated power module comprising:
- a common primary DC-to-DC converter including a primary circuit that is adapted to be coupled to a voltage source, an intermediate voltage bus, and a plurality of secondary circuits that are each coupled to the primary circuit and are selectively coupled to the intermediate voltage bus;
- a plurality of switches that selectively couples the integrated power module to the intermediate voltage bus; and
- a plurality of power conditioners that are each coupled to the intermediate voltage bus and have respective power outputs.

* * * * *